United States Patent [19]

Persing

[11] Patent Number: 5,035,626

[45] Date of Patent: Jul. 30, 1991

[54] MARKERBOARD

[75] Inventor: Brian J. Persing, Northgate, Mich.

[73] Assignee: Westinghouse Electric Corp., Pittsburgh, Pa.

[21] Appl. No.: 531,994

[22] Filed: Jun. 1, 1990

[51] Int. Cl.$^5$ ............................................. G09B 19/00
[52] U.S. Cl. ..................................... 434/408; 434/429
[58] Field of Search ............... 434/408, 413, 415, 417, 434/418, 423, 425, 429; 40/642; D19/52, 54

[56] References Cited

U.S. PATENT DOCUMENTS

| | | | |
|---|---|---|---|
| D. 165,038 | 10/1951 | Windhorst | D19/52 |
| 883,402 | 3/1908 | Hainline | 434/417 |
| 1,984,845 | 12/1934 | Smith et al. | 434/417 |
| 3,283,421 | 11/1966 | Schott | 434/415 |
| 3,762,116 | 10/1973 | Anderson et al. | 52/239 |
| 3,949,132 | 4/1976 | Seregely et al. | 434/408 X |
| 4,401,222 | 8/1983 | Kulikowski et al. | 211/94 |
| 4,779,369 | 10/1988 | Hill et al. | 40/642 X |
| 4,978,568 | 12/1990 | Postma | 434/408 X |

FOREIGN PATENT DOCUMENTS

| | | | |
|---|---|---|---|
| 2114620 | 4/1973 | Fed. Rep. of Germany | 434/425 |
| 1450281 | 9/1976 | United Kingdom | 434/408 |

Primary Examiner—Richard J. Apley
Assistant Examiner—Rachel M. Healey

[57] ABSTRACT

A markerboard which includes a rectangular substrate having first and second side edges, top and bottom edges, and front and rear major flat surfaces. A plastic sheet having an erasable surface is fixed to the front surface of the substrate and wrapped over the entire upper edge and at least partially over the remaining edges. A bottom rail is supported by the bottom edge of the substrate, with the bottom rail having first and second ends and a longitudinal groove which extends between the ends having a lip for supporting accessories. First and second stiles cover and conceal the sidewardly facing first and second edges of the substrate and the first and second ends of the bottom rail. The first and second stiles and bottom rail all have having front-facing surfaces which are substantially co-planar with the erasable surface, without overlap over the erasable surface.

6 Claims, 4 Drawing Sheets

MARKERBOARD

TECHNICAL FIELD

The invention relates in general to a markerboard, and more specifically to a markerboard suitable for use with an office space dividing partition system.

BACKGROUND ART

Markerboards for use in office space dividing partition systems usually have a fixed outwardly extending ledge which extends across the bottom thereof for supporting dry erase markers and erasers.

Such markerboards usually require an outer frame for concealing the edges of the erasable surface, as materials commonly used for marker surfaces, such as porcelain steel and melamine, often chip when cut to size. Porcelain steel and melamine boards would be costly to manufacture with finished wrapped around surfaces or edges that would be suitable for flush trim or framing, e.g., trim or framing that does not overlap the edges of the marker surface.

SUMMARY OF THE INVENTION

Briefly, the present invention is a new and improved markerboard for office space dividing partition systems which has a very thin profile. No parts of the markerboard, including framing, trim and support ledges, extend outwardly past the erasable surface itself. The edges of the markerboard's communicating surface are all finished, permitting flush trimming or framing pieces to be used, and also enabling the upper edge to be untrimmed, if desired. The structure of the markerboard which permits easily achieving finished edges of the communicating surface also contributes to a relatively low manufacturing cost.

More specifically, the markerboard includes a substrate, such as particle board, having front and back major surfaces and side, top, and bottom edges. A flexible plastic sheet having an erasable surface on at least one side thereof, such as vinyl having a coating of polypropylene, is fixed to the front surface of the substrate, such as with an adhesive, and the sheet extends at least partially over the edges. In a preferred embodiment, the plastic sheet is wrapped completely over the top edge, providing a finished edge without trim. The at least partial wrap over the side and bottom edges of the substrate permits side stiles and a bottom rail to be attached to the substrate which are flush with the erasable surface, i.e., there is no overlap of the stiles and rail, permitting vertically oriented front surfaces of the side stiles and bottom rail to be co-planar with the erasable surface.

The bottom rail is provided with a cavity accessible from the front surface via an elongated groqve, the bottom of which is defined by an upstanding lip suitable for hanging accessories, such as a tray for holding dry erase markers and an eraser. Thus, whether or not accessories are used at all is optional, the length of an accessory item, when used, is optional, and the position of an accessory item relative to the length of the markerboard is optional.

BRIEF DESCRIPTION OF THE DRAWINGS

The invention will become more apparent by reading the following detailed description in conjunction with the drawings, which are shown by way of example only, wherein.

DESCRIPTION OF PREFERRED EMBODIMENTS

Figure 1:
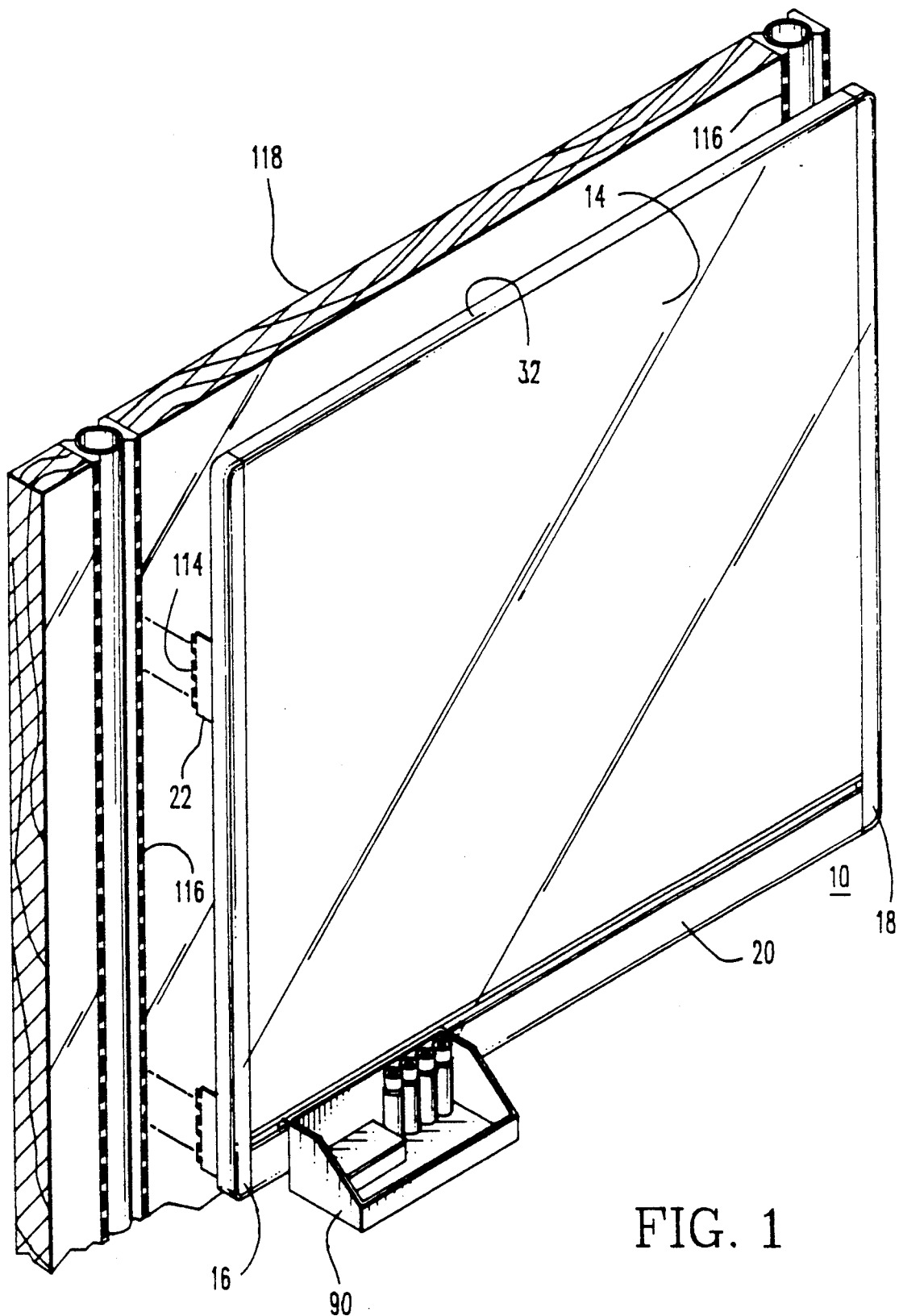
FIG. 1 is a perspective view of a markerboard constructed according to the teachings of the invention.

Referring now to the drawings, there is shown a markerboard 10 constructed according to the teachings of the invention. Markerboard 10 includes a solid substrate or core 12, best shown in FIGS. 2, 3, 4 and 6, erasable means 14 best shown in FIGS. 2, 3, 4 and 6, first and second stiles or vertical frame members 16 and 18, best shown in FIGS. 1 and 2, a lower rail 20, best shown in FIGS. 2 and 6, and a plurality of mounting clips 22, best shown in FIG. 2.

The substrate 12 is constructed of a suitable support material, such as wood particle board. Substrate 12 has a relatively large outer rectangular configuration, such as 28 to 40 inches high and 36 to 48 inches wide, and a relatively thin depth, such as 0.75 inch. Substrate 12 has front and back major opposed parallel surfaces 24 and 26, respectively, best shown in FIG. 6, first and second longitudinal ends having vertically extending side edges 28 and 30, respectively, a top edge 32 and a bottom edge 34. The edges 28, 30, 32 and 34 extend between, and are in general perpendicular to, the major front and back surfaces 24 and 26.

The erasable means 14 is a flexible plastic sheet, hereinafter referred to as plastic sheet 14, with plastic sheet 14 being sized to cover the front surface 24 of substrate 12, and additionally to completely wrap over the top edge 32, and to at least partially wrap over the first and second side and bottom edges 28, 30 and 34, respectively. In a preferred embodiment of the invention, plastic sheet 14 is a polypropylene coated vinyl sheet. Plastic sheet 14 is fixed to substrate 12, such as with a suitable adhesive. A suitable polypropylene coated vinyl, adhesive-backed sheet is available from Sun Process, Elk Grove Village, Ill. 60007.

Figure 4:
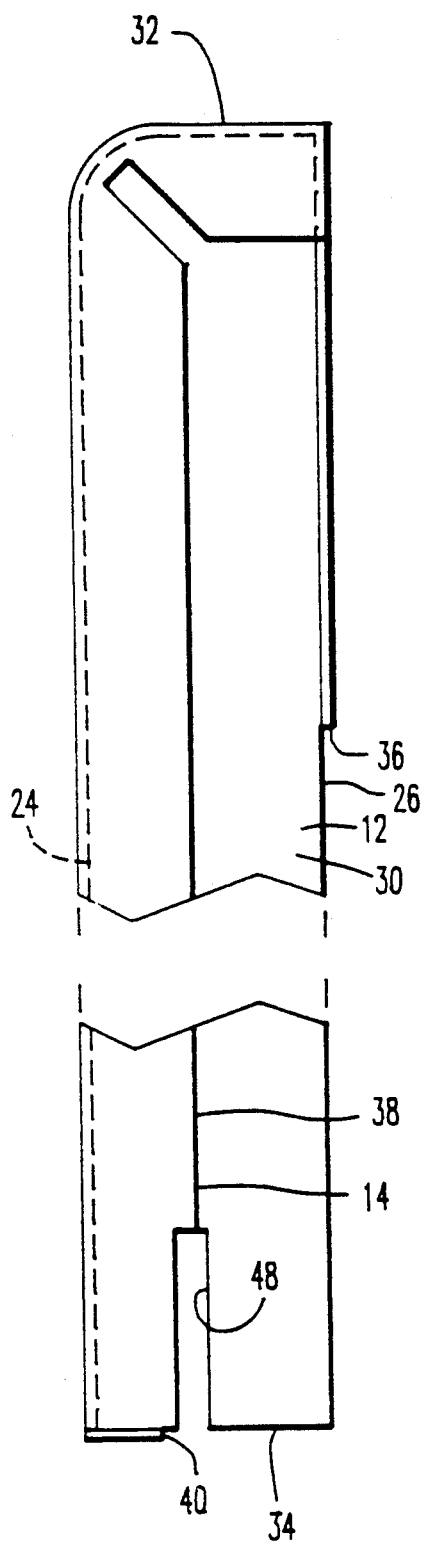
FIG. 4 is an enlarged, fragmentary end elevational view of the markerboard shown in FIG. 1, illustrating the application of a polypropylene coated vinyl sheet to a substrate.

FIG. 4 is a side elevational view of substrate 12 with plastic sheet 14 secured thereto, indicating the complete wrap of the top edge 32 which continues on to the back surface 26 of substrate 12, ending at sheet edge 36. Plastic sheet 14 extends partially across each side edge 28 and 30, as illustrated in FIG. 4, ending at sheet edge 38. In like manner, plastic sheet 14 extends partially across the bottom edge 34, ending at sheet edge 40. The partial wraps of the side edges 28 and 30 and bottom edge 34 is sufficient, as these edges are covered and the sheet edges captured by the stiles 16 and 18 and bottom rail 20 during assembly of markerboard 10, as will be hereinafter explained.

Figure 2:
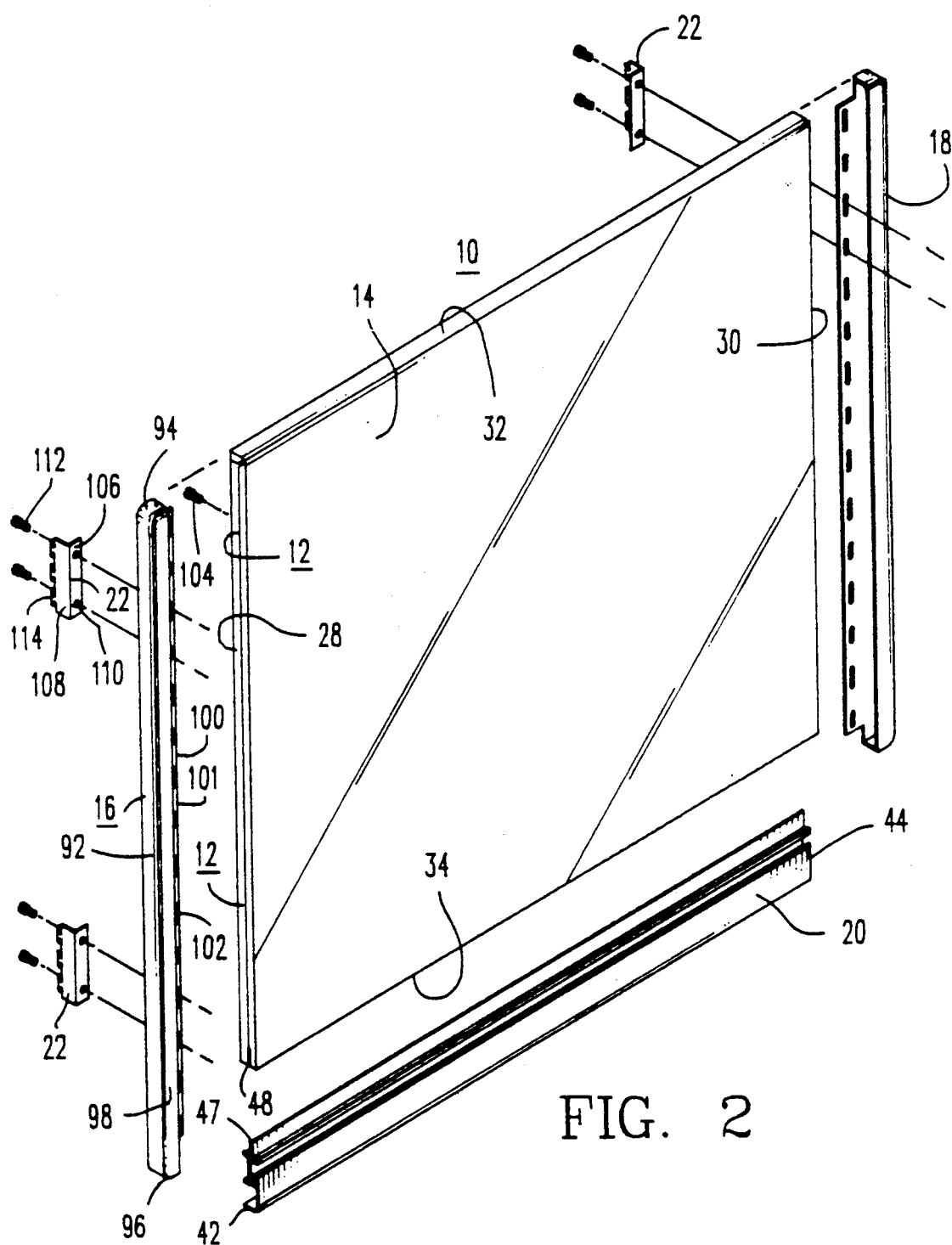
FIG. 2 is an exploded perspective view of the markerboard shown in FIG. 1.
Figure 5:
FIG. 5 is a top plan view of the markerboard shown in FIG. 1.
Figure 3:
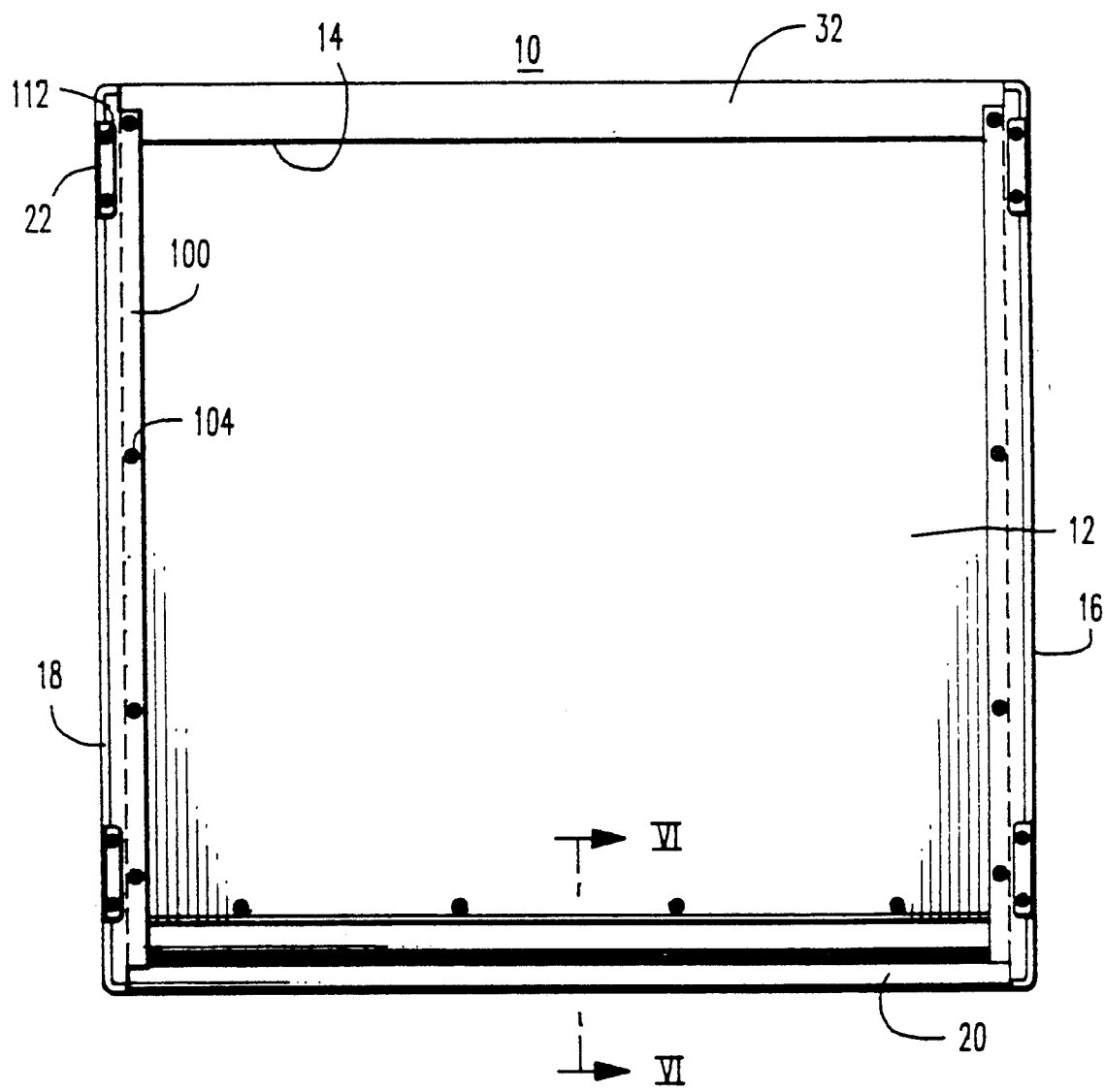
FIG. 3 is a rear elevational view of the markerboard shown in FIG. 1.
Figure 6:
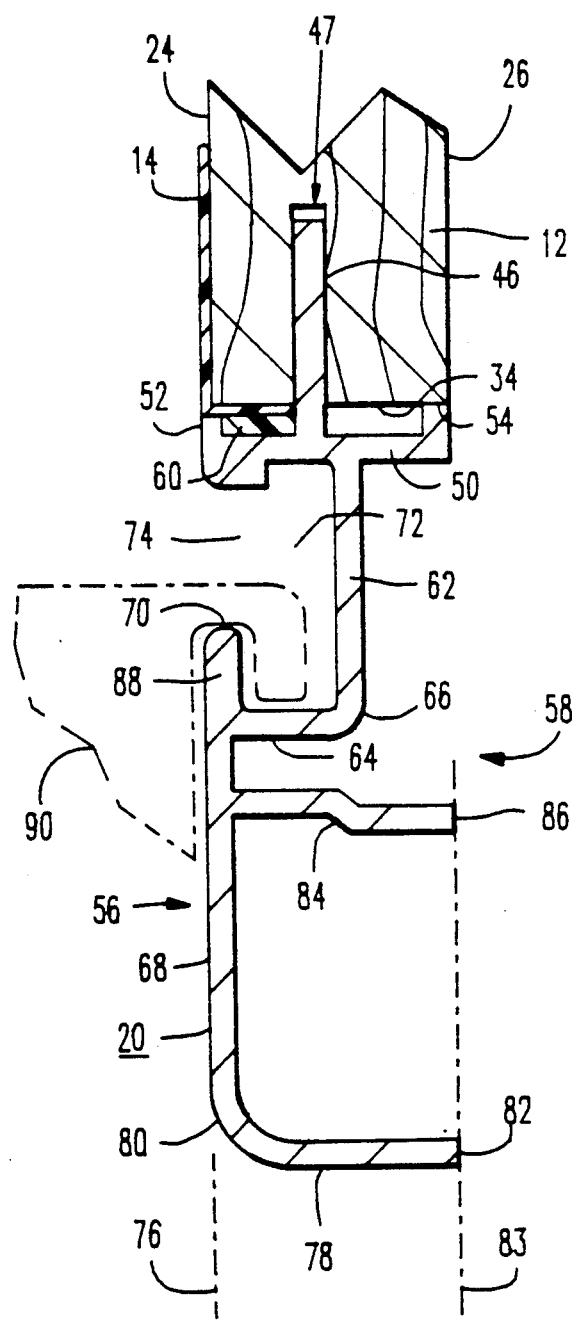
FIG. 6 is a sectional view of the markerboard, taken between and in the direction of arrows VI—VI in FIG. 3.

The bottom rail 20 is preferably a metallic extrusion, such as aluminum, with the bottom rail 20 being shown in perspective in FIG. 2, and more clearly in an enlarged cross-sectional view in FIG. 6, which view is taken between and in the direction of arrows VI—VI in the rear view of markerboard 10 in FIG. 3. Bottom rail 20 is an elongated structure having first and second longitudinal ends 42 and 44, respectively. With reference to FIG. 6, bottom rail 20 includes an upstanding wall 46 at an upper end 47 thereof which is sized to snugly enter a groove 48 in the bottom edge 34 of substrate 12. Upstanding wall 46 rises upwardly from a central portion of a horizontal member 50 having upturned lips 52 and 54 which run along front and rear sides 56 and 58 of rail 20. The bottom edge 34 of substrate 12 rests upon lips 52 and 54, with a piece of foam tape 60 being disposed in a cavity formed between the front lip 52 and wall 46. The foam tape 60, such as a polyolefin, closed cell foam tape having an adhesive on one side, for example, insures that the portion of plastic sheet 14 which is folded over the bottom edge 34 of substrate 12 remains folded over and in continuous contact with bottom edge 34.

A wall 62 depends from a central portion of horizontal member 50, which joins a horizontal leg 64 via a right angle bend 66 which directs horizontal leg 64 towards the front side 56 of rail 20. Horizontal leg 64 joins a front wall 68 below an upper edge 70 thereof, forming a cavity 72 accessible via an elongated slot 74 which runs along the front side 56 of rail 20. The front wall 68 is substantially co-planar with the plastic sheet 14, with a vertical plane 76 passing through the outer facing surfaces of plastic sheet 14 and the front wall 68. The front wall 68 enters a bottom edge 78 via a smoothly curved right angle bend 80. The bottom edge 78 ends at 82, with the surface of end 82 being co-planar with lip 54 and the back surface 26 of substrate 12, as indicated by plane 83. An additional stiffening leg 84 may extend perpendicularly outward from an inner side of front wall 68, towards the back 58 of rail 20, ending at 86, which end also lies in plane 83. When the lower rail 20 is press fit into the slot 48 in the bottom edge 34 of substrate, which operation may also include additional securing means, such as an adhesive, the upstanding lip 52 firmly and uniformly clamps a portion of plastic sheet 14 which has been wrapped over the lower edge 34 of the substrate 12.

The front wall 68 forms a lip 88 starting at its upper edge 70 and ending at horizontal portion 64, which lip functions to hold optional accessories, such as a marker and eraser tray 90 shown in FIG. 1 and in phantom in FIG. 6.

The stiles 16 and 18 are preferably formed of metal, such as aluminum, and they have a length dimension selected to cover and conceal the side edges 28 and 30 of the substrate 12, as well as to cover and conceal the ends 42 and 44 of the bottom rail 20. In addition to the trim function, the stiles 16 and 18 provide a uniform clamping function for the partial over-wrap of the plastic sheet 14 around the side edges 28 and 30 of the substrate 12.

Each stile 16 and 18, such as stile 16, as best shown in FIG. 2, has a vertically oriented outer side 92 which smoothly curves into upper and lower portions 94 and 96, which portions smoothly blend into the upper edge 32 of the substrate 12 and the lower edge 78 of the bottom rail. A vertically oriented front 98 of stile 16 is coplanar with the plastic sheet 14 and the front wall 68 of the bottom rail 20, and a back portion 100 of stile 16 includes an integral outwardly extending flange 101 which lies against the back surface 26 of substrate 12. Flange 101 has a plurality of spaced openings 102 for receiving screws 104.

Each mounting clip 22, as best shown in FIG. 2, is an L-shaped bracket having first and second legs 106 and 108. Leg 106 has openings 110 for receiving screws 112 for attaching mounting clip 22 to the back portion 100 of a stile 16 or 18. The second leg 108 has T-shaped connectors 114 dimensioned to enter openings in slotted standards 116 of an office space dividing partition system 118 shown in FIG. 1.

In summary, there has been disclosed a new markerboard 10 which provides a writing or communicating surface for dry erase markers which includes a flexible plastic sheet 14 wrapped over a front surface of a substrate 12, including the substrate's edges, permitting a wrap-around marker surface on the upper edge 32, and permitting flush trim or frame pieces to be used on the remaining three edges 28, 30 and 34. No parts of the markerboard 10 extend past the plane 76 of the marker surface, providing a very thin profile of about 0.75 inch. A bottom rail 20 has an elongated slot 74 having an accessory receiving lip 88 for optionally hanging items such as a small shelf 90 for holding a dry erasable pen set and an eraser, paper management items, and the like. Markerboard 10 may be quickly attached to the slotted standards 116 of an office space dividing partition system 118, at any desired height, and just as quickly removed, using slotted standard mounting clips 22 which are attached to the back side of markerboard 10. The disclosed construction of markerboard 10 facilitates manufacturing thereof, without cutting and chipping problems.

I claim:

1. A markerboard comprising:
   a substantially rectangular support substrate having front and back major opposed sides, first and second longitudinal ends, a top edge and a bottom edge,
   erasable means on at least the front side of said support substrate having an erasable surface,
   an elongated rail depending from the bottom edge of the support substrate,
   said elongated rail having a front surface which is substantially co-planar with the erasable surface of the erasable means, first and second ends adjacent to the first and second longitudinal ends of the support substrate, and a lower edge,
   said elongated rail defining a cavity and an elongated slot in the front surface which extends between the first and second ends and which communicates with the cavity,
   said elongated slot having upper and lower edges, with the lower edge being defined by an upstanding accessory support lip,
   and first and second elongated stiles fixed to the first and second ends of the substrate, with said first and second elongated stiles extending from the top of the support surface to the lower edge of the elongated rail.

2. The markerboard of claim 1 wherein the erasable means is a plastic sheet which completely covers the front side of the substrate and which is wrapped over the upper edge of the substrate to complete the upper edge of the markerboard.

3. The markerboard of claim 2 wherein the plastic sheet extends over the first and second ends and bottom edge of the substrate, with the bottom rail and first and second stiles aiding in securing the plastic sheet to the substrate.

4. The markerboard of claim 3 wherein the first and second stiles have front surfaces co-planar with the erasable surface of the erasable means, whereby the first and second stiles and elongated rail, which also has a front surface co-planar with the erasable surface, trim the first and second ends and bottom edge of the substrate without extending over the front surface of the substrate.

5. The markerboard of claim 2 wherein the plastic sheet includes a coating of polypropylene on at least the side which provides the erasable surface.

6. The markerboard of claim 2 wherein the plastic sheet is formed of vinyl which has a coating of polypropylene on at least the side which provides the erasable surface.

* * * * *